United States Patent
Brunn et al.

(10) Patent No.: US 11,443,112 B2
(45) Date of Patent: Sep. 13, 2022

(54) OUTCOME OF A NATURAL LANGUAGE INTERACTION

(71) Applicant: International Business Machines Corporation, Armonk, NY (US)

(72) Inventors: Jonathan F. Brunn, Logan, UT (US); Rachael Marie Huston Dickens, Raleigh, NC (US); Rui Zhang, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 390 days.

(21) Appl. No.: 16/563,270

(22) Filed: Sep. 6, 2019

(65) Prior Publication Data

US 2021/0073327 A1 Mar. 11, 2021

(51) Int. Cl.
*G06F 40/205* (2020.01)
*G06K 9/62* (2022.01)
*G06F 17/18* (2006.01)
*G06F 40/279* (2020.01)

(52) U.S. Cl.
CPC ............ *G06F 40/205* (2020.01); *G06F 17/18* (2013.01); *G06F 40/279* (2020.01); *G06K 9/628* (2013.01); *G06K 9/6277* (2013.01)

(58) Field of Classification Search
CPC ...... G06F 40/205; G06F 17/18; G06F 40/279; G06F 40/35; G06F 40/30; G06F 16/285; G06F 16/353; G06F 16/24578; G06F 16/35; G06F 16/355; G06F 16/36; G06F 40/10; G06F 9/546; G06K 9/6277; G06K 9/628;

(Continued)

(56) References Cited

U.S. PATENT DOCUMENTS

| 8,479,285 B2* | 7/2013 | Moyle ..................... G06F 21/55 726/13 |
| 9,621,624 B2 | 4/2017 | Stolorz et al. |
| 10,366,168 B2* | 7/2019 | Wu ......................... G06F 40/56 |

(Continued)

OTHER PUBLICATIONS

Aloui et al., Automatic Classification and Response of E-mails, vol. 1, Issue 1, Mar. 2010, pp. 3-9 (Year: 2010).*

(Continued)

*Primary Examiner* — Linda Wong
(74) *Attorney, Agent, or Firm* — Garg Law Firm, PLLC; Rakesh Garg; Jordan Schiller

(57) ABSTRACT

Using a natural language analysis, a current message is classified into a current message class, the current message being a portion of an interaction in narrative text form. For the interaction using a state prediction model, an interaction outcome corresponding to the current message class is forecasted, the forecasting comprising computing a probability that the current message class will result in a successful message class. Using the state prediction model, a set of next message classes and a set of predicted interaction outcomes are determined, each message in the set of next message classes corresponding to the current message class, each predicted interaction outcome in the set of predicted interaction outcomes corresponding to a next message class in the set of next message classes. According to the corresponding predicted interaction outcome, the set of next message classes is ranked.

17 Claims, 8 Drawing Sheets

(58) Field of Classification Search
CPC .................. G10L 25/51; G10L 15/142; G10L 2015/0631; G10L 17/16; G10L 15/08
See application file for complete search history.

(56) References Cited

U.S. PATENT DOCUMENTS

| | | |
|---|---|---|
| 2005/0246165 A1 | 11/2005 | Pettinelli et al. |
| 2006/0256937 A1 | 11/2006 | Foreman et al. |
| 2013/0325992 A1 | 12/2013 | McGann et al. |
| 2015/0256675 A1 | 9/2015 | Sri et al. |
| 2016/0226813 A1 | 8/2016 | Cecchi et al. |
| 2016/0291840 A1* | 10/2016 | Patil ..................... G06F 3/0482 |
| 2018/0307673 A1 | 10/2018 | Akkiraju et al. |
| 2019/0034420 A1 | 1/2019 | Brunn et al. |
| 2019/0364001 A1* | 11/2019 | Dotan-Cohen ......... H04L 51/12 |
| 2020/0084055 A1* | 3/2020 | Brunn ................... H04L 51/046 |
| 2020/0142999 A1* | 5/2020 | Pedersen .............. G06K 9/6263 |
| 2021/0042586 A1* | 2/2021 | Toyoshiba .............. G06F 17/18 |
| 2021/0073670 A1* | 3/2021 | Brunn ...................... G06N 5/02 |

OTHER PUBLICATIONS

Oraby et al., "How May I Help You?: Modeling Twitter Customer Service Conversations Using Fine-Grained Dialogue Acts." In Proceedings of the 22nd International Conference on Intelligent User Interfaces (IUI '17). ACM, New York, 343-355, 2017.
List of IBM's related applications, Appendix P, 2019.

* cited by examiner

OUTCOME OF A NATURAL LANGUAGE INTERACTION

TECHNICAL FIELD

The present invention relates generally to a method, system, and computer program product for analyzing a natural language interaction. More particularly, the present invention relates to a method, system, and computer program product for improving an outcome of a natural language interaction.

BACKGROUND

A natural language is a scripted (written) or a vocalized (spoken) language having a form that is employed by humans for primarily communicating with other humans or with systems having a natural language interface. Natural language processing (NLP) is a technique that facilitates exchange of information between humans and data processing systems. For example, one branch of NLP pertains to transforming human readable or human understandable content into machine usable data. For example, NLP engines are presently usable to accept input content such as a newspaper article or human speech, and produce structured data, such as an outline of the input content, most significant and least significant parts, a subject, a reference, dependencies within the content, and the like, from the given content. Another branch of NLP pertains to cognitive analytics, the process of analyzing available information or knowledge to create, infer, deduce, or derive new information.

Conversation-based collaboration tools are becoming common. A conversation-based collaboration tool is software that allows a member of a group of users to send messages to one or more members of the group, forming a natural language conversation or chat. Teams, especially when not all team members work in the same location, typically use a collaboration tool for rapid, informal, electronic interactions, much like those that could take place if the entire team worked in one room. Typically, the natural language conversation is conducted in text form. However, input to the conversation can also be converted from another modality, such as speech, into text for processing and transmission to other participants, then contributions to the conversation from other participants converted back into speech a human can hear.

A message is a unit of conversation. A message is a portion of narrative text, or another form of narrative communication converted into narrative text, communicated from a user to one or more users. A message need not conform to a grammar, but may also be any natural language word or phrase. A message can also include a collaborative action, such as sharing a file or a reference to a website. An interaction is a group of messages.

Many conversational interactions follow a workflow pattern. A workflow pattern is a sequence of states, each state corresponding to a portion of an interaction. One example of a workflow pattern is setting up a meeting, in which interaction participants discuss some combination of a time, place, participants, and topic of the meeting, then eventually agree and successfully schedule the meeting. Another example of a workflow pattern is a task assignment, in which interaction participants identify a task and someone to perform the task. A workflow pattern can also be a part of a larger workflow pattern. For example, a task assignment might be a part of a larger sequence of a task request, followed by a commitment to perform the task, followed by an indication that a task is in progress, followed by an indication that the task is complete, followed by an indication that the work product of the completed task has been validated.

A workflow pattern has a final state, also called an outcome. An outcome can be successful—e.g., a meeting is scheduled, or someone accepts a task assignment. An outcome can also be unsuccessful—e.g., a meeting is not scheduled because a key participant is unavailable, or someone declines a task assignment. An outcome can also be within a range, with a successful outcome at one end and an unsuccessful outcome at the other end. Thus, an outcome that is not definitely either successful or unsuccessful might be in the middle of such a range. For example, an outcome that is neither successful nor unsuccessful might be that the meeting is never definitively scheduled or cancelled because the meeting schedulers segued into an unrelated discussion.

SUMMARY

The illustrative embodiments provide a method, system, and computer program product. An embodiment includes a method classifies, using a natural language analysis, a current message into a current message class, the current message being a portion of an interaction in narrative text form. An embodiment forecasts, for the interaction using a state prediction model, an interaction outcome corresponding to the current message class, the forecasting comprising computing a probability that the current message class will result in a successful message class. An embodiment determines, using the state prediction model, a set of next message classes and a set of predicted interaction outcomes, each message in the set of next message classes corresponding to the current message class, each predicted interaction outcome in the set of predicted interaction outcomes corresponding to a next message class in the set of next message classes. An embodiment ranks, according to the corresponding predicted interaction outcome, the set of next message classes.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
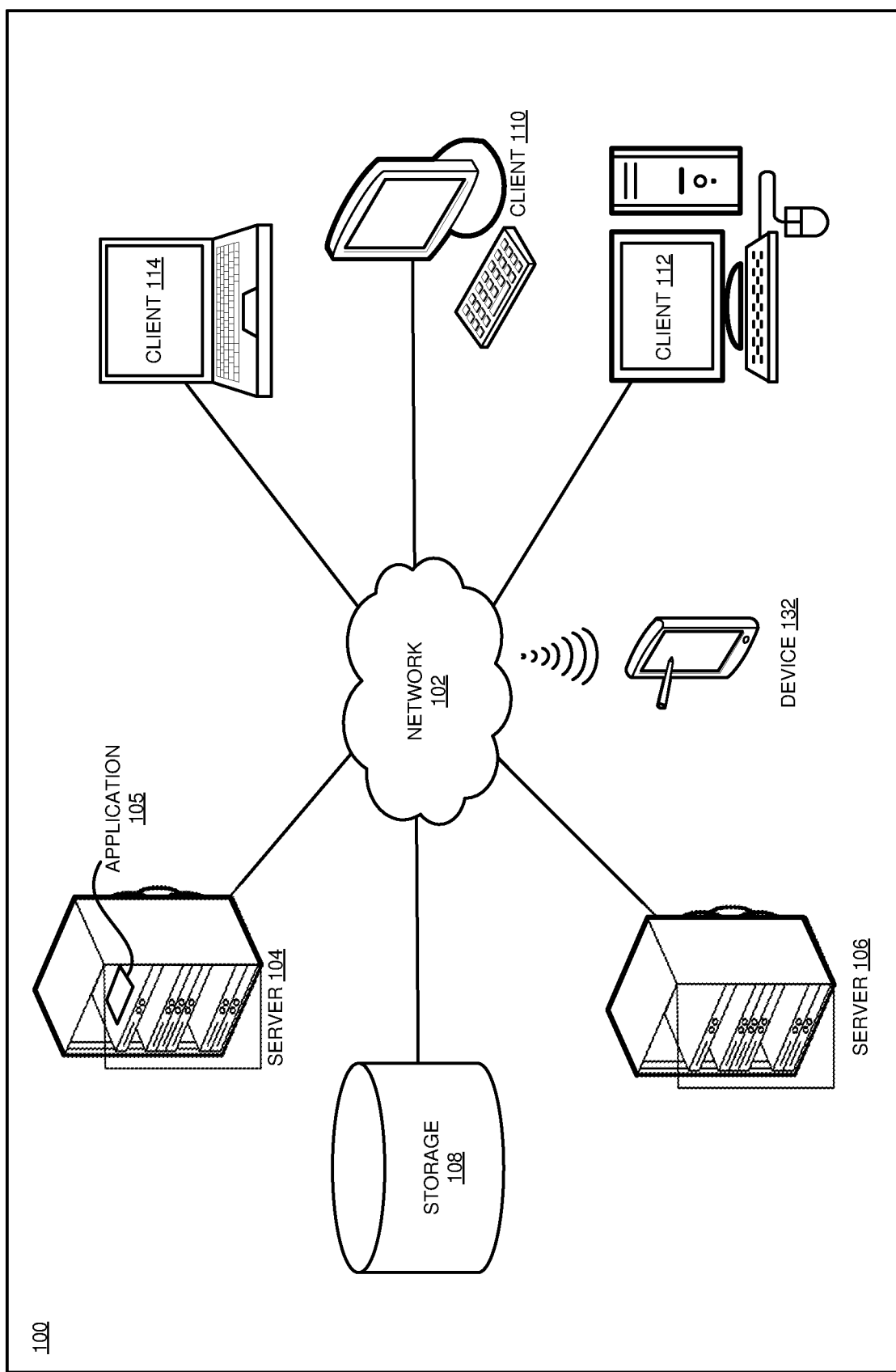
FIG. 1 depicts a block diagram of a network of data processing systems in which illustrative embodiments may be implemented.

The illustrative embodiments recognize that, while conversation-based collaboration tools provide an easy, natural way of communicating, the result is an undifferentiated flow of messages. An interaction, especially among more than two users, can include many threads, each proceeding on its own timeline and including numerous messages. When a user generates a new message in an interaction, it can be difficult to identify to which previous message (or action) is being addressed, or if the new message has no previous message (i.e. is the start of a new thread). Just as in face-to-face interactions, an interaction about one topic may segue into another topic, or the two topics may become intermingled, even if a tool attempts to divide interactions by topic area. Participants may implicitly refer to subject matter discussed previously or answer questions asked several messages back in the interaction.

The illustrative embodiments also recognize that the messages exchanged in conversation-based collaboration tools can include information that follows a workflow pattern. For example, one conversation participant might ask for a status report by Friday, and another conversation participant might agree to provide one. However, because of the number of messages in a conversation, the intermingled nature of topics in a conversation, and the rapidity and informality of the conversation, it might be difficult for the first participant to determine who will provide the report and by when. In addition, a subsequent state in a workflow pattern may come sufficiently later in an interaction and sufficiently removed from context that it can be difficult for a human user to identify the pattern. Although prior-art applications allow users to thread messages and mark messages as actions or decisions manually and search, filter or sort by those labels, these actions are performed manually. Requiring users to perform manual steps is cumbersome, time consuming, and undermines the benefits of the rapid, informal interaction collaboration tools provide.

The illustrative embodiments also recognize that, because it can be difficult for a human user to identify a workflow pattern, it can also be difficult for a human user to predict an unsuccessful outcome and take steps to improve the outcome. For example, one conversation participant might ask for a status report by Friday, another might reply that she is too busy, a third might reply that she can do it but only by Monday, a fourth might ask a follow-up question, and several others might not reply at all but instead discuss lunch plans. Once some time has passed and intervening messages communicated, it can be difficult for the first participant to realize that no one ever agreed to provide a status report by Friday and take steps to remedy the situation. Consequently, the illustrative embodiments recognize that there is an unmet need to automatically identify messages that are part of a workflow pattern, predict an outcome of the pattern, and assist users in improving the outcome.

The illustrative embodiments recognize that the presently available tools or solutions do not address these needs or provide adequate solutions for these needs. The illustrative embodiments used to describe the invention generally address and solve the above-described problems and other problems related to improving an outcome of a natural language interaction.

An embodiment can be implemented as a software application. The application implementing an embodiment can be configured as a modification of an existing conversation-based collaboration system, as a separate application that operates in conjunction with an existing conversation-based collaboration system, a standalone application, or some combination thereof.

Particularly, some illustrative embodiments provide a method of, for a message in an interaction, forecasting an interaction outcome and determining a set of next message classes ranked according to their predicted interaction outcomes. Once the ranked set of next message classes has been determined, an embodiment performs other tasks associated with the set of next message classes, such as suggesting one or more responses to the message.

An embodiment classifies a message, or a portion of a message into a message class. To classify the message, an embodiment uses any suitable natural language analysis classification technique. A message can be classified into more than one class.

One embodiment uses a set of classification modules, each configured to identify a particular natural language feature or pattern. For example, one classification module identifies messages in which someone appears to be looking for an expert, and messages including a query to which the answer is likely to be a person's name. Another example classification module identifies an action within a message, and a commitment in another message. Another example classification module identifies meetings and meeting-related information, such as the meeting subject, time, or place. Another example classification module identifies messages that are confirmations or negations. A simpler example classification module identifies messages that include an account number, or a stock ticker symbol. In one classification module implementation, each module performs its own classification independently of the other modules. Thus, for example, the account number and stock ticker symbol modules could independently classify a message (for example, one including a customer's account number and an order to sell 500 shares of a particular stock and place the proceeds in the referenced account) as including both an account number and a stock ticker symbol. In another classification module implementation, a module has the ability to consult prior classifications of other messages, or other classifications of a current message, in determining a classification.

Classifying messages aids an embodiment in determining and using a conversational pattern, such as a workflow pattern. For example, a request for a meeting is often followed by a series of messages involving the time and place of the meeting.

An embodiment models conversational patterns using a Markov inference model. Message classes are represented by nodes, or states, in the Markov model. Thus, every state within the model represents either a message class, or a sequence of preceding message classes. In probability theory, a conditional probability is a measure of the probability of an event occurring given that another event has occurred. Thus, using the Markov model, if a message is in class 1, denoted by $C_1$, there is a conditional probability $P(C_2|C_1)$ (i.e., the probability of $C_2$ given $C_1$) that this message in $C_1$ will be followed by a message in class 2, denoted by $C_2$. In the model, a single class need not lead to only one other class. Instead, multiple classes may lead to one class, or one class may lead, with corresponding probabilities, to multiple classes.

An embodiment trains the model using pairs of messages. In one training implementation, when a new message arrives at an embodiment for analysis, the embodiment asks a user to identify a parent message of the new message, where a parent message is a previous message related to the new message. For example, if a new message is, "Let's meet at six," a parent message might be, "What time should we meet?" Conversely, a child message is a successor of a parent message. Thus, a new message can be a child of a parent message. In another training implementation, instead of asking a user to identify a parent message when a later message is received, a message classifier can be configured to identify a parent message class as part of new message classification. In another training set implementation, instead of asking a user to identify a parent message when a later message is received, an entire interaction is formed into a thread and parent and child messages identified using any suitable technique.

An embodiment classifies both the new (or child) and parent messages into one or more message classes, in a manner described herein. A class of the new message is denoted by $C_m$, and a class of the parent message is denoted by $C_p$. Then an embodiment trains the model by updating the conditional probability $P(C_m|C_p)$ with the expression (number of previous instances of $C_p$ preceding $C_m$)/(number of previous $C_p$ instances), where an instance refers to an occurrence of $C_p$ or $C_m$ within interactions the model has processed. In addition, because the number of $C_p$ instances is incremented each time a new message having $C_p$ as the class of the parent message is processed, all conditional probabilities using $C_p$ require corresponding updates.

An embodiment uses the trained model as a state prediction model to determine a probability of success for an interaction including a current message class. In particular, if the model includes n states, each state can be denoted by $C_i$, where i=1 to n. Each state has a corresponding probability of success (denoted by $PS_i$), denoting a probability that the modeled interaction outcome, starting from state i, will be a class labeled as a successful class. Thus, using a 0-1 scale, a message class corresponding to a successful outcome (e.g., someone accepts a task assignment) has a probability of success equal to 1. A message class corresponding to an unsuccessful outcome (e.g., someone declines a task assignment) has a probability of success equal to 0. A message class corresponding to an outcome that is not definitely either successful or unsuccessful (e.g., parameters of the task assignment are still being discussed) has a probability of success between 0 and 1. In particular, for a message class with a probability of success that is not equal to 0 or 1, an embodiment calculates the probability of success using the expression $PS_i=\text{sum}(PS_j*P(C_j|C_i))$, for all integers j from 1 to n, where j is not equal to i.

An embodiment need not recompute $PS_i$ for every node in the state prediction model every time a new message is received and classified. Instead, an embodiment can set $PS_i$ for some leaf nodes (nodes not followed by a subsequent node), then proceed backwards from a leaf node, computing $P(C_j|C_i)$ and $PS_i$ using any suitable technique. To determine $PS_i$ for some leaf nodes, one embodiment asks users to rate an interaction as successful or unsuccessful. Another embodiment asks users to provide a numerical rating for the success of an interaction. Another embodiment infers success of an interaction from a subsequent user or software action. For example, if during or immediately following an interaction, a user enters meeting details into a calendar tool, an embodiment can infer that the interaction involved setting up a meeting and was successful. As another example, if another software program is able to identify a purchase in an e-commerce site as being contemporaneous with an interaction an embodiment or the other software program can infer that the interaction involved a purchase and was successful. An embodiment can also determine the probability of success for certain nodes (usually leaf nodes) based on the probability of those nodes being correlated with some action. The message classifier of an embodiment can also mark certain message classes as successful or unsuccessful.

As well, an embodiment can reuse a value of $PS_i$ for a particular i, and only update $PS_i$ if a $P(C_j|C_i)$ on which $PS_i$ depends changes. Optionally, if the probability of success for the interaction is above a threshold value (for example, 0.9 on a 0-1 scale), no intervention is needed to improve this interaction, and an embodiment ends processing for the current message.

If the probability of success for the interaction is not above a threshold value, or if a threshold value is not used, an embodiment uses the trained model to determine a set of next message classes, with reference to the current message's class. In particular, because a trained model already includes the conditional probability $P(C_m|C_p)$ for every message class, by setting $C_p$ to the class of a current message, an embodiment determines $P(C_m|C_p)$ for each class in the model. One embodiment uses, as the set of next message classes, each message class with a conditional probability of proceeding from the current message class to the next message class that is higher than zero. Another embodiment uses, as the set of next message classes, each message class with a conditional probability of proceeding from the current message class to the next message class that is higher than a non-zero threshold value. Another embodiment limits the set of next message classes to a particular size, for example the two or five message classes having the highest, non-zero, conditional probabilities of proceeding from the current message class to the next message class. Other methods of selecting the set of next message classes are also possible and contemplated within the scope of the illustrative embodiments.

Another embodiment uses a different model as a state prediction model. This different model can be trained, if required, using any training method suitable to the model used.

An embodiment determines a corresponding probability of success for each message class in the set of next message classes, and ranks the set of next message classes by each class's corresponding probability of success. Thus, a highest-ranked next message class is most likely to lead to a successful interaction outcome. Another embodiment determines a corresponding probability of success for message classes in the set of next message classes that have probability values above a threshold probability value, thus avoiding computing an expected outcome for a low-probability event.

An embodiment uses the ranked set of next message classes to construct and present one or more suggested response types to an interaction participant, to attempt to improve the predicted outcome of the interaction. For example, if the current message class is a task, two suggested response types might be a task commitment and a follow-up request.

Another embodiment uses the ranked set of next message classes to construct and present one or more suggested natural language responses to an interaction participant, to attempt to improve the predicted outcome of the interaction. For example, if the current message class is a task, two suggested natural language responses might be "I can do that" (a task commitment) and "I might be able to help, but I have questions first" (a follow-up request). An embodiment then allows the interaction participant to select a suggested response or provide his or her own response. An embodiment constructs suggested natural language responses using any suitable natural language response construction technique. Several suitable natural language response construction techniques are presently available.

The manner of improving an outcome of a natural language interaction described herein is unavailable in the presently available methods in the technological field of endeavor pertaining to natural language analysis. A method of an embodiment described herein, when implemented to execute on a device or data processing system, comprises substantial advancement of the functionality of that device or data processing system in, for a message in an interaction, forecasting an interaction outcome and determining a set of next message classes ranked according to their predicted interaction outcomes. Once the ranked set of next message classes has been determined, an embodiment performs other tasks associated with the set of next message classes, such as suggesting one or more responses to the message.

The illustrative embodiments are described with respect to certain types of interactions, message, classes, models, probabilities, outcomes, rankings, forecasts, thresholds, responses, response types, rankings, adjustments, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
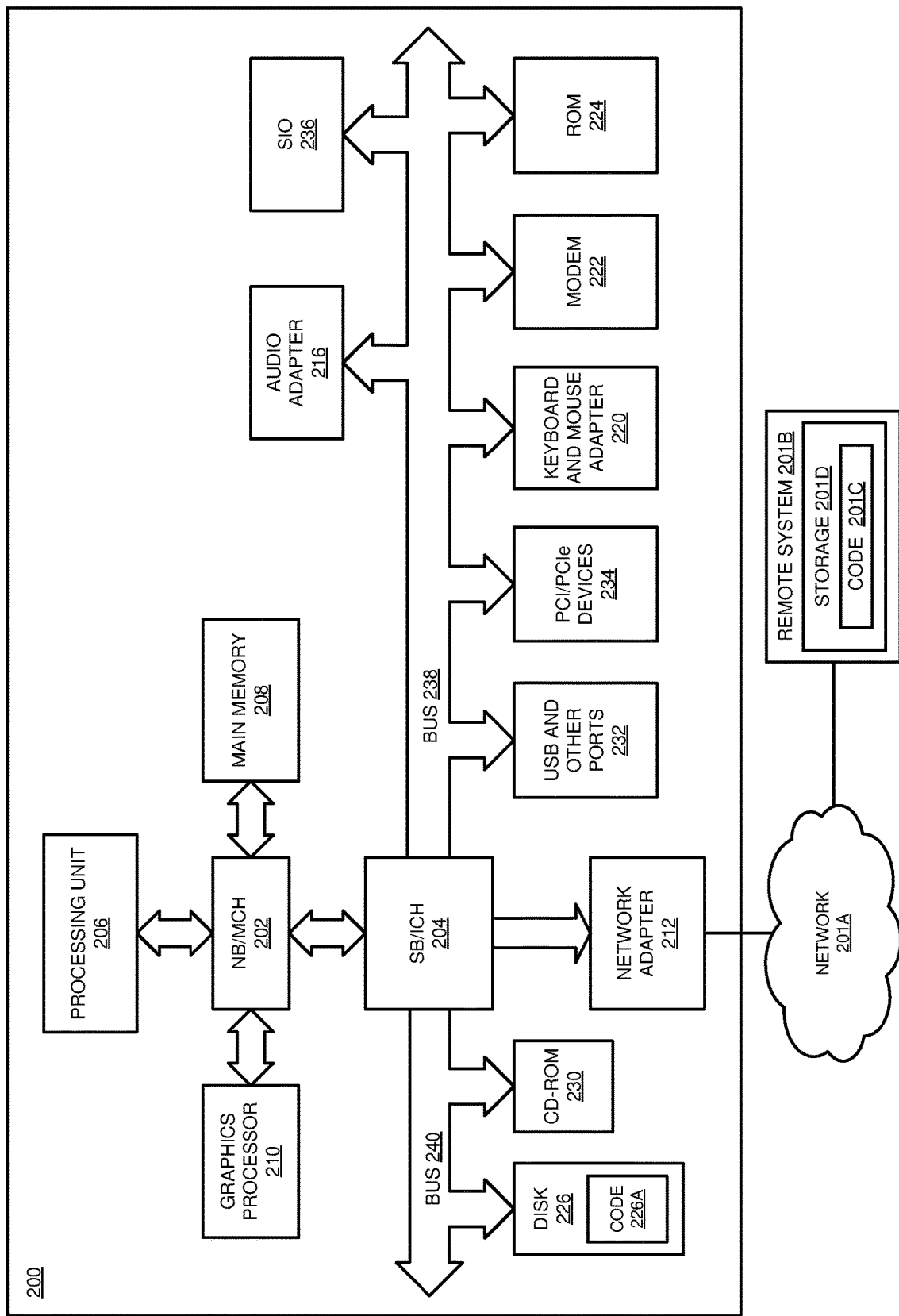
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can execute in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
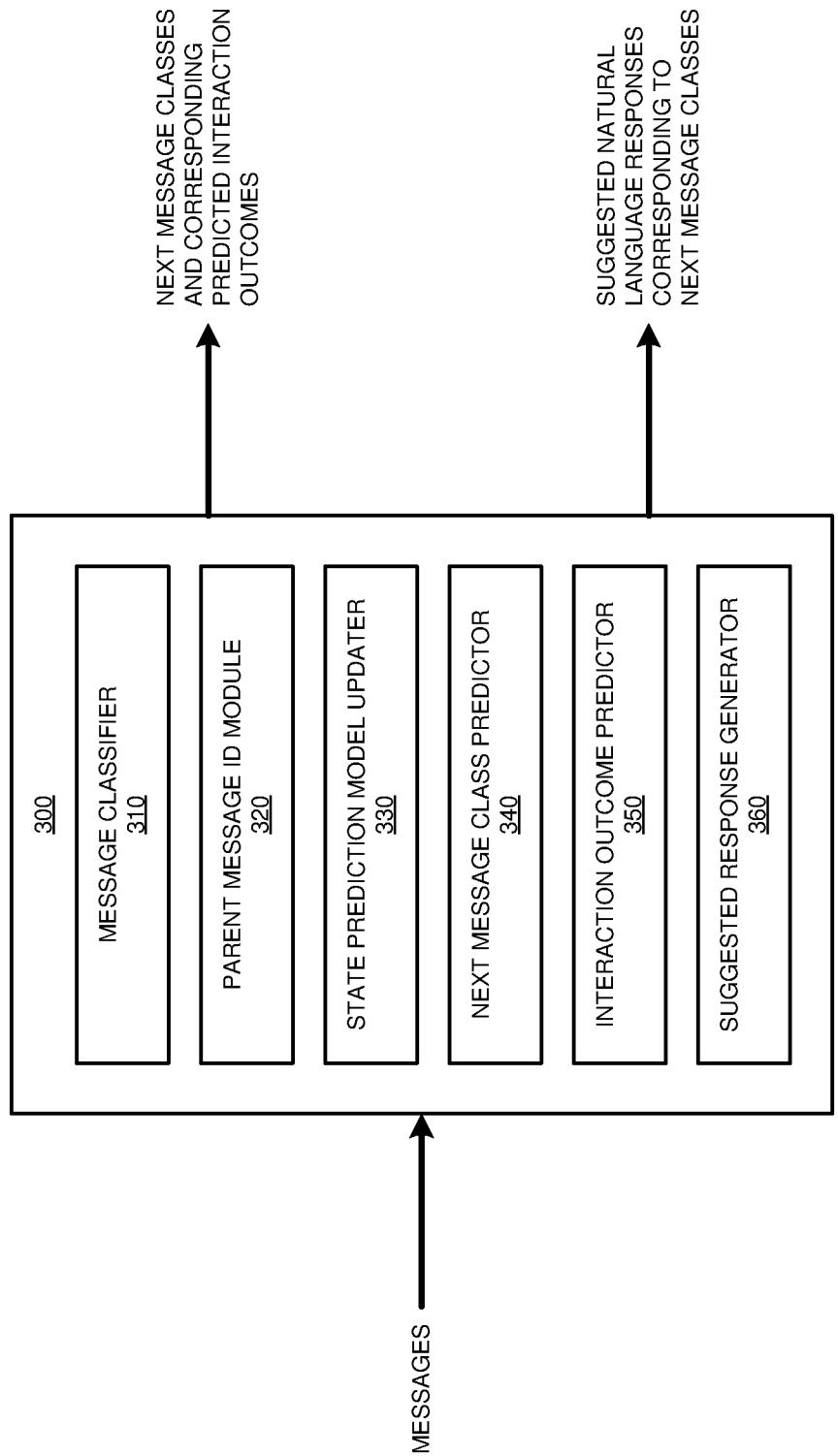
FIG. 3 depicts a block diagram of an example configuration for improving an outcome of a natural language interaction in accordance with an illustrative embodiment.

With reference to FIG. 3, this figure depicts a block diagram of an example configuration for improving an outcome of a natural language interaction in accordance with an illustrative embodiment. Application 300 is an example of application 105 in FIG. 1 and executes in any of servers 104 and 106, clients 110, 112, and 114, and device 132 in FIG. 1.

Message classifier 310 classifies a message, or a portion of a message into a message class. To classify the message, module 310 uses any suitable natural language analysis classification technique. A message can be classified into more than one class.

One implementation of module 310 uses a set of classification modules, each configured to identify a particular natural language feature or pattern. For example, one classification module identifies messages in which someone appears to be looking for an expert, and messages including a query to which the answer is likely to be a person's name. Another example classification module identifies an action within a message, and a commitment in another message. Another example classification module identifies meetings and meeting-related information, such as the meeting subject, time, or place. Another example classification module identifies messages that are confirmations or negations. A simpler example classification module identifies messages that include an account number, or a stock ticker symbol. In a classification module implementation, each module performs its own classification independently of the other modules.

Application 300 trains the model using pairs of messages. In one training implementation, when a new message arrives for analysis, parent message identification module identifies a parent message of the current message, by asking a user to identify a parent message of the new message, by using message classifier 310, or using another implementation. Message classifier 310 classifies both the new (or child) and parent messages into one or more message classes, in a manner described herein. Then state prediction model updater 330 trains the model by updating the conditional probability $P(C_m|C_p)$ with the expression (number of previous instances of $C_p$ preceding $C_m$)/(number of previous $C_p$ instances), where an instance refers to an occurrence of $C_p$ or $C_m$ within interactions the model has processed. In addition, because the number of $C_p$ instances is incremented each time a new message having $C_p$ as the class of the parent message is processed, all conditional probabilities using $C_p$ require corresponding updates.

Interaction outcome predictor 350 uses the trained model as a state prediction model to determine a probability of success for an interaction including a current message class. In particular, for a message class with a probability of success that is not equal to 0 or 1, module 350 calculates the probability of success using the expression $PS_i = \text{sum}(PS_j * P(C_j|C_i))$, for all integers j from 1 to n, where j is not equal to i. Module 350 need not recompute $PS_i$ for every node in the state prediction model every time a new message is received and classified. Instead, module 350 can set $PS_i$ to a constant for some leaf nodes, then proceed backwards from a leaf node, computing $P(C_j|C_i)$ and $PS_i$ using any suitable technique. As well, module 350 can reuse a value of $PS_i$ for a particular i, and only update $PS_i$ if a $P(C_j|C_i)$ on which $PS_i$ depends changes. Optionally, if the probability of success for the interaction is above a threshold value (for example, 0.9 on a 0-1 scale), no intervention is needed to improve this interaction, and application 300 ends processing for the current message.

If the probability of success for the interaction is not above a threshold value, or if a threshold value is not used, next message class predictor 340 uses the trained model to determine a set of next message classes, with reference to the current message's class. In particular, because a trained model already includes the conditional probability $P(C_m|C_p)$ for every message class, by setting $C_p$ to the class of a current message, module 340 determines $P(C_m|C_p)$ for each class in the model. One implementation of module 340 uses, as the set of next message classes, each message class with a conditional probability of proceeding from the current message class to the next message class that is higher than zero. Another implementation of module 340 uses, as the set of next message classes, each message class with a conditional probability of proceeding from the current message class to the next message class that is higher than a non-zero threshold value. Another implementation of module 340 limits the set of next message classes to a particular size, for example the two or five message classes having the highest, non-zero, conditional probabilities of proceeding from the current message class to the next message class.

Interaction outcome predictor 350 determines a corresponding probability of success for each message class in the set of next message classes, and ranks the set of next message classes by each class's corresponding probability of success. Thus, a highest-ranked next message class is most likely to lead to a successful interaction outcome.

Suggested response generator 360 uses the ranked set of next message classes to construct and present one or more suggested response types to an interaction participant, to attempt to improve the predicted outcome of the interaction. For example, if the current message class is a task, two suggested response types might be a task commitment and a follow-up request.

Suggested response generator 360 also uses the ranked set of next message classes to construct and present one or more suggested natural language responses to an interaction participant, to attempt to improve the predicted outcome of the interaction. For example, if the current message class is a task, two suggested natural language responses might be "I can do that" (a task commitment) and "I might be able to help, but I have questions first" (a follow-up request). Application 300 then allows the interaction participant to select a suggested response, or provide his or her own response.

Figure 4:
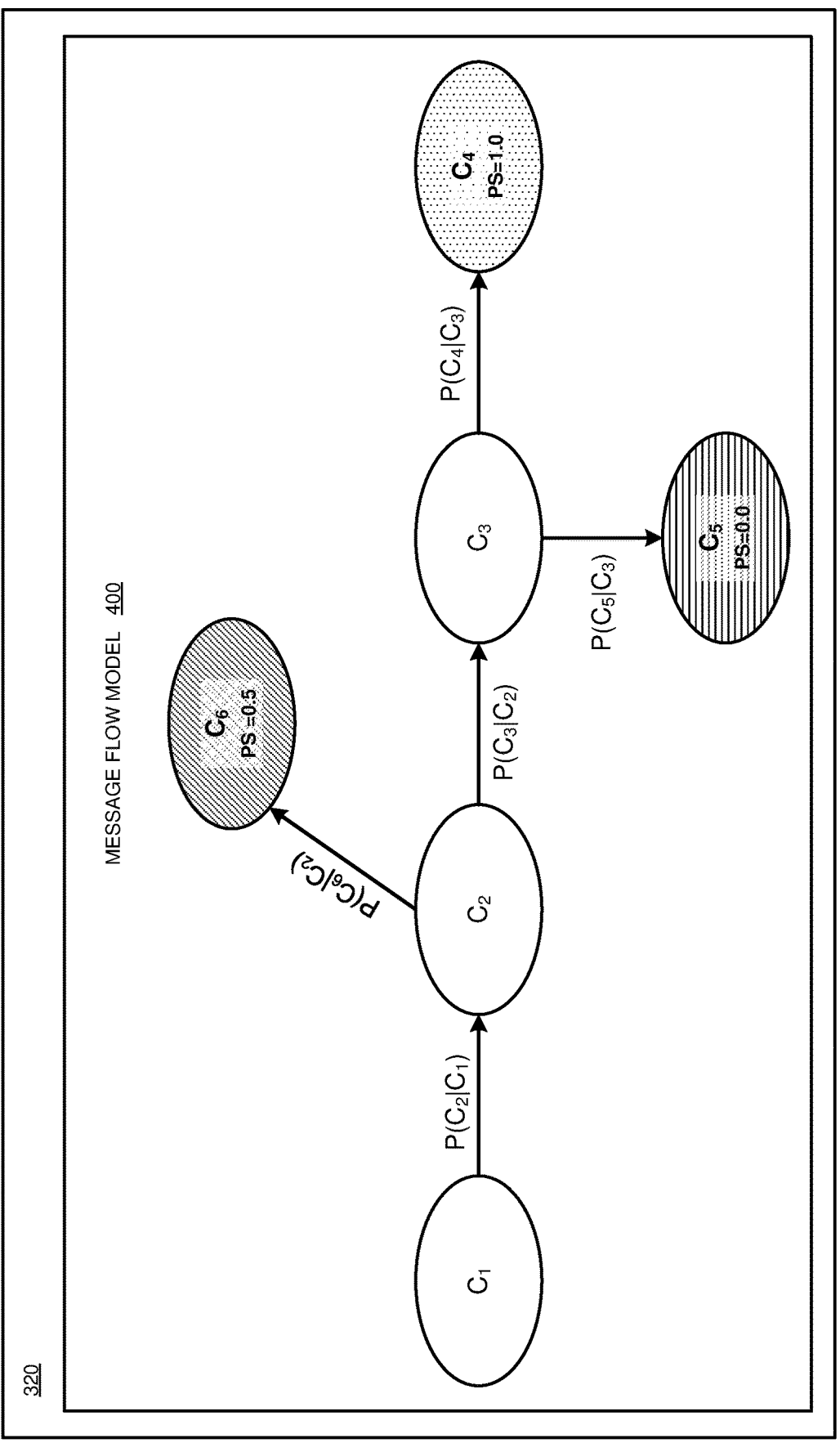
FIG. 4 depicts an example of an inference model for use as part of an example configuration for improving an outcome of a natural language interaction in accordance with an illustrative embodiment.

With reference to FIG. 4, this figure depicts an example of an inference model for use as part of an example configuration for improving an outcome of a natural language interaction in accordance with an illustrative embodiment. Message flow model 400 is used by modules 330, 340, and 350 in FIG. 3.

In particular, FIG. 4 depicts Markov inference model 400, used to model conversation patterns. $C_1$, $C_2$, $C_3$, $C_4$, $C_5$, and $C_6$ represent message classes. Model 400 has already been trained, and conditional probabilities for moving from one message class to another have been determined. Thus, if a message is in class 1, denoted by $C_1$, there is a conditional probability $P(C_2|C_1)$ (i.e., the probability of $C_2$ given $C_1$) that the message in $C_1$ will be followed by another message in $C_2$. Similarly, there is a conditional probability $P(C_3|C_2)$ that a message in $C_2$ will be followed by a message in $C_3$. $C_4$, $C_5$, and $C_6$ are leaf nodes, with no successor message classes. Using a 0-1 scale, $C_4$ is a message class corresponding to a successful outcome (e.g., someone accepts a task assignment) has a probability of success equal to 1. $C_5$ is a message class corresponding to an unsuccessful outcome (e.g., someone declines a task assignment) has a probability of success equal to 0. $C_6$ is a message class corresponding to an outcome that is not definitely either successful or unsuccessful (e.g., parameters of the task assignment are still being discussed) and has a probability of success of 0.5, between 0 and 1.

Figure 5:
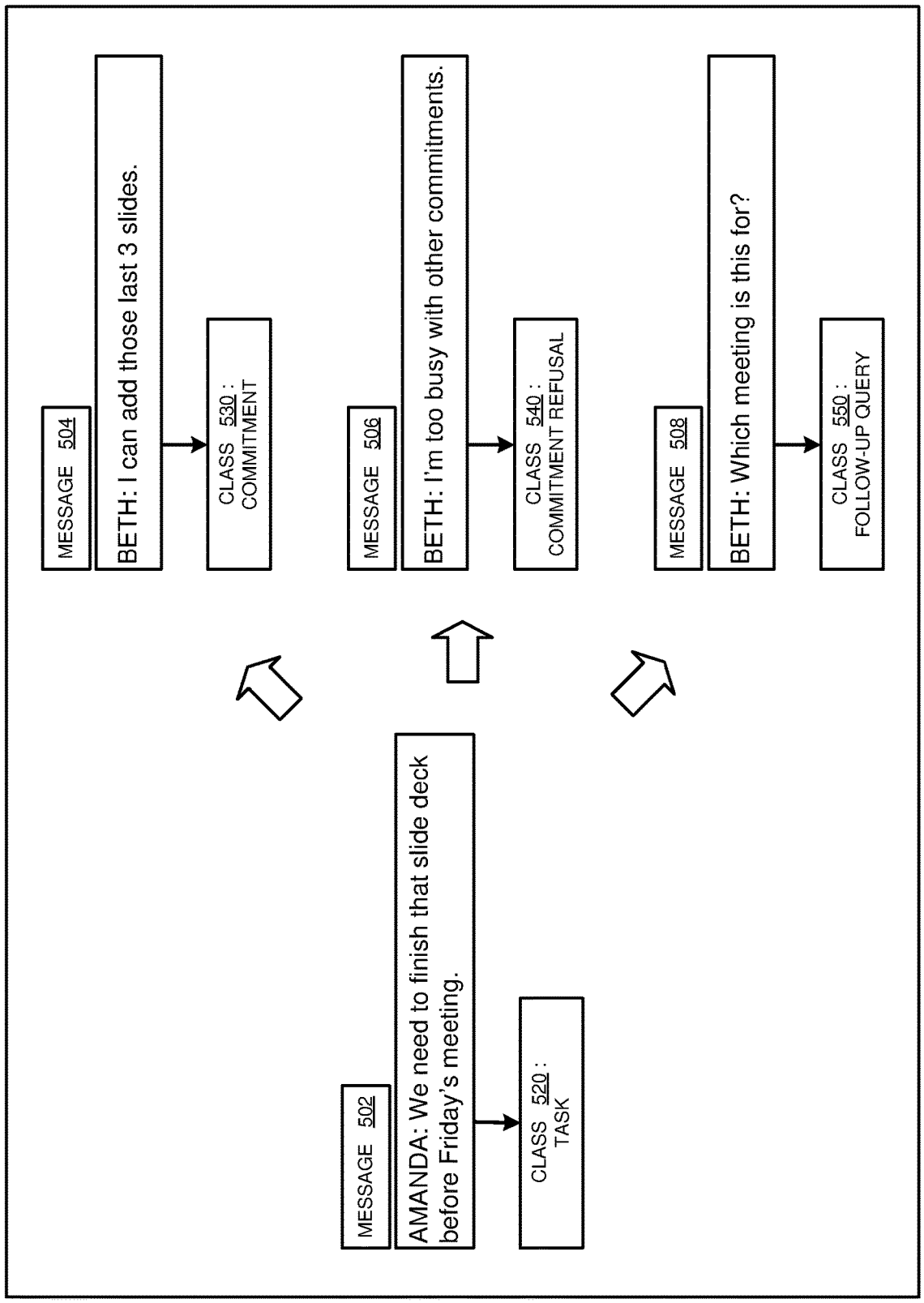
FIG. 5 depicts an example of a state prediction model to improve an outcome of a natural language interaction in accordance with an illustrative embodiment.

With reference to FIG. 5, this figure depicts an example of a state prediction model to improve an outcome of a natural language interaction in accordance with an illustrative embodiment. The example can be executed using application 300 in FIG. 3.

In message 502, an interaction participant has a task assignment. Accordingly, application 300 classifies message 502 into class 520, a task. From class 520, as modeled, the interaction can proceed to three different classes, or states. Message 504, classified into class 530, a commitment, is a response in which another participant commits to perform the task. Message 506, classified into class 540, a commitment refusal, is a response in which another participant declines the task. Message 508, classified into class 550, a follow-up query, is a response in which another participant does not commit to or decline the task, but instead has a follow-up query relating to the task. The classes are defined such that class 530 has a probability of success equal to 1, class 540 has a probability of success equal to 0, and class 550 has a probability of success between 0 and 1 (all on a 0-1 scale). As a result, the probability of success for class 520 is $1*P(C_{530}|C_{520})+0*P(C_{540}|C_{520})+PS_{550}*P(C_{550}|C_{520})$, where $P(C_{530}|C_{520})$, $P(C_{540}|C_{520})$, and $P(C_{550}|C_{520})$ have all been determined using the expression $P(C_m|C_p)$ with the expression (number of previous instances of $C_p$ preceding $C_m$)/(number of previous $C_p$ instances), where $C_m$ denotes a message class and $C_p$ denotes a parent message class of $C_m$.

Figure 6:
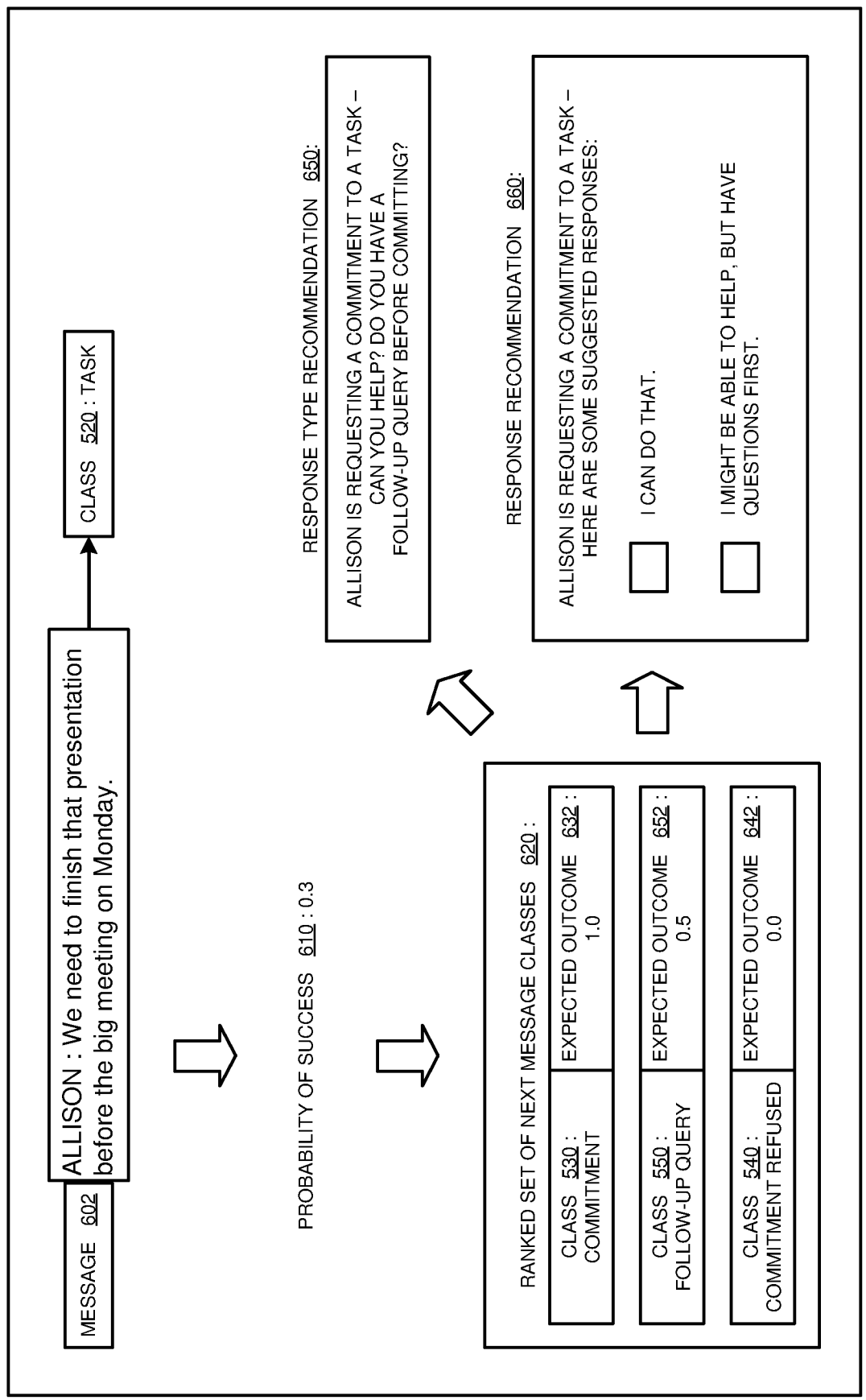
FIG. 6 depicts an example of improving an outcome of a natural language interaction in accordance with an illustrative embodiment.

With reference to FIG. 6, this figure depicts an example of improving an outcome of a natural language interaction in accordance with an illustrative embodiment. Classes 520, 530, 540, and 550 are the same as classes 520, 530, 540, and 550 in FIG. 5. The example can be executed using application 300 in FIG. 3.

In message 602, an interaction participant has a task assignment. Accordingly, application 300 classifies message 602 into class 520, a task. Application 300 also determines probability of success 610 corresponding to the interaction of which message 602 is a part. Here, probability of success 610=0.3. Because probability of success 610 for the interaction is not above a threshold value, application 300 uses a trained state prediction model to determine a set of next message classes, with reference to the current message's class. In particular, application 300 determines ranked set of next message classes 620. Set 620 includes classes 530, 540, and 550, with corresponding expected outcomes 632, 652, and 642.

Application 300 uses set 620 to construct and present one or more suggested response types to an interaction participant, to attempt to improve the predicted outcome of the interaction. In particular, application 300 suggests response type recommendation 650. Thus, because message 602 was classified as a task, response type recommendation 650 suggests two response types: a task commitment and a follow-up request.

Application 300 uses set 620 to construct and present one or more suggested natural language responses to an interaction participant, to attempt to improve the predicted outcome of the interaction. In particular, application 300 suggests response recommendation 650, which includes two suggested natural language responses and an opportunity for an interaction participant to select a suggested response.

Figure 7:
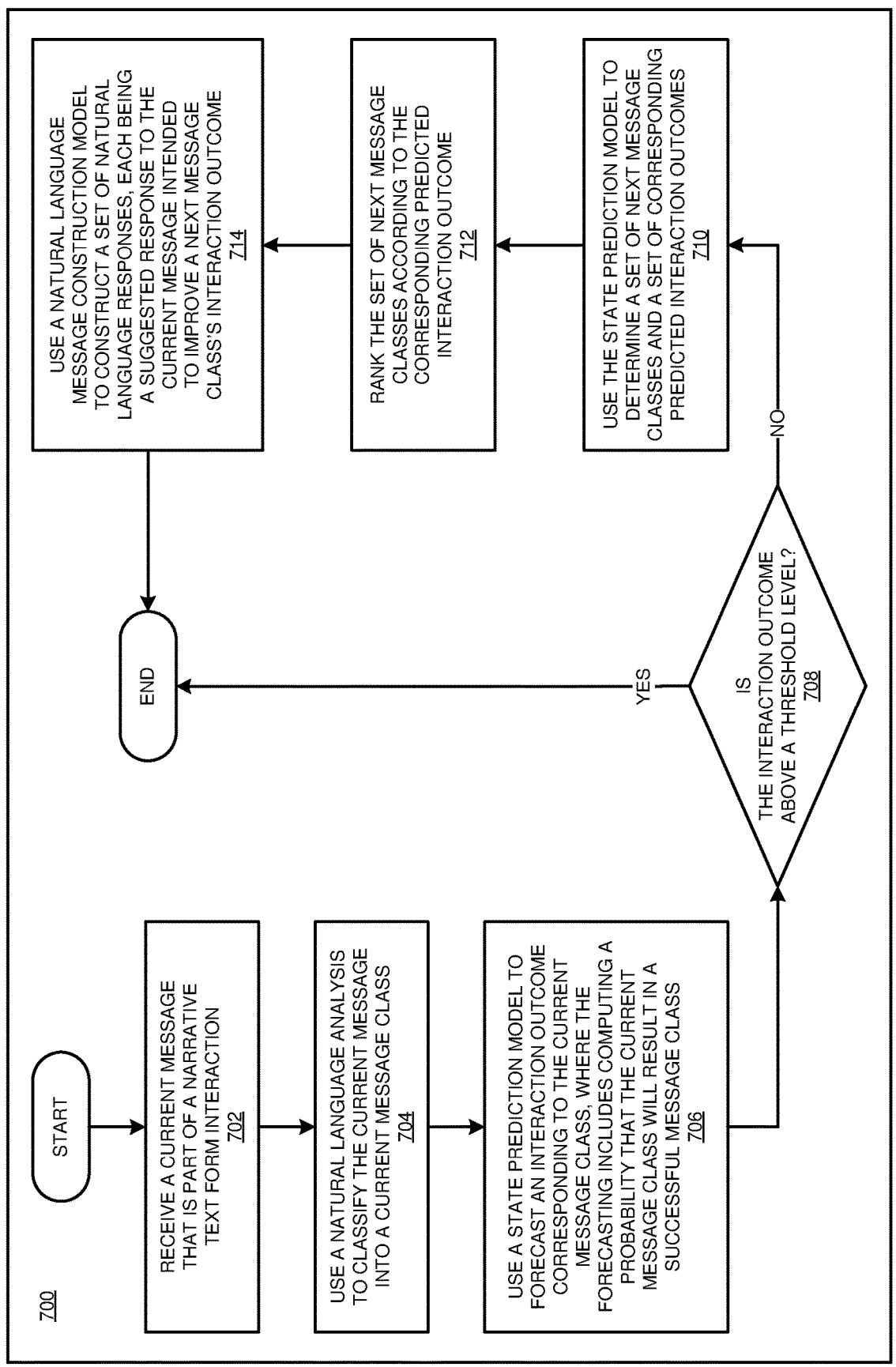
FIG. 7 depicts a flowchart of an example process for improving an outcome of a natural language interaction in accordance with an illustrative embodiment.

With reference to FIG. 7, this figure depicts a flowchart of an example process for improving an outcome of a natural language interaction in accordance with an illustrative embodiment. Process 700 can be implemented in application 300 in FIG. 3.

In block 702 the application receives a current message that is part of a narrative text form interaction. In block 704 the application uses a natural language analysis to classify the current message into a current message class. In block 706 the application uses a state prediction model to forecast an interaction outcome corresponding to the current message class, where the forecasting includes computing a probability that the current message class will result in a successful message class In block 708 the application checks whether the interaction outcome is above a threshold level. If yes ("YES" path of block 708), the application ends. Otherwise ("NO" path of block 708), in block 710 the application uses the state prediction model to determine a set of next message classes and a set of corresponding predicted interaction outcomes. In block 712 the application ranks the set of next message classes according to the corresponding predicted interaction outcome. In block 714 the application uses a natural language message construction model to construct a set of natural language responses, each being a suggested response to the current message intended to improve a next message class's interaction outcome. Then the application ends.

Figure 8:
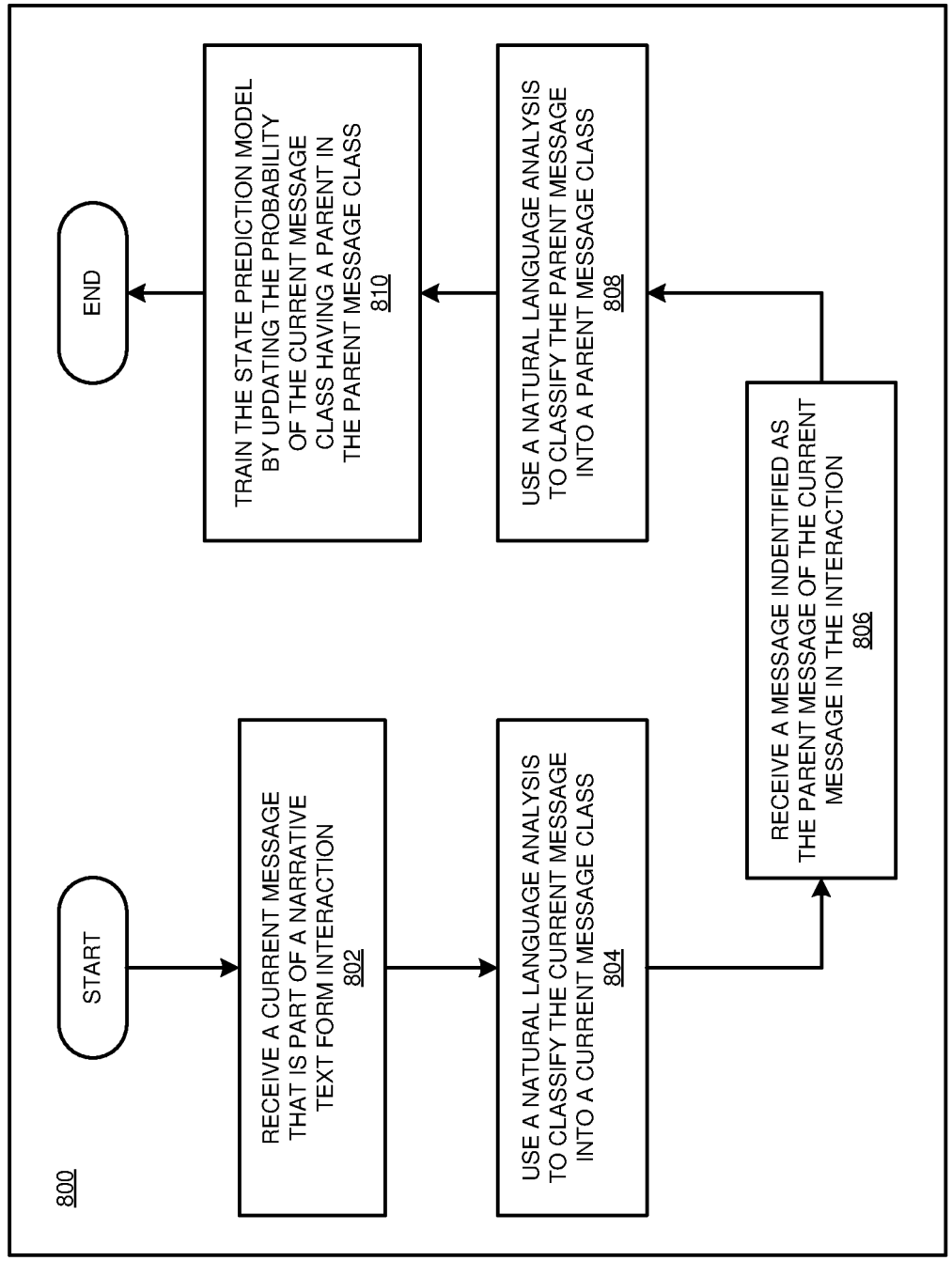
FIG. 8 depicts a flowchart of an example process for improving an outcome of a natural language interaction in accordance with an illustrative embodiment.

With reference to FIG. 8, this figure depicts a flowchart of an example process for improving an outcome of a natural language interaction in accordance with an illustrative embodiment. Process 800 can be implemented in application 300 in FIG. 3.

In block 802 the application receives a current message that is part of a narrative text form interaction. In block 804 the application uses a natural language analysis to classify the current message into a current message class. In block 806 the application receives a message identified as the parent message of the current message in the interaction. In block 808 the application uses a natural language analysis to classify the parent message into a parent message class. In block 810 the application trains the state prediction model by updating the probability of the current message class having a parent in the parent message class. Then the application ends.

Thus, a computer implemented method, system or apparatus, and computer program product are provided in the illustrative embodiments for improving an outcome of a natural language interaction and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   training a state prediction model using a plurality of message sequences, each message in a message sequence classified into a message class, the training comprising configuring a Markov inference model to determine a plurality of conditional probabilities, each conditional probability comprising a probability of a message in a second message class following a message in a first message class, wherein a message class is represented by a node in the Markov inference model, the conditional probability is represented by a numerical value assigned to a link between corresponding nodes in the Markov inference model, wherein the training results in a trained state prediction model;
   classifying, using a natural language analysis, a current message into a current message class, the current message being a portion of an interaction in narrative text form;
   forecasting, for the interaction using the trained state prediction model, an interaction outcome corresponding to the current message class, the forecasting comprising computing a probability that the current message class will result in a successful message class, wherein the probability that the current message class will result in a successful message class is computed by evaluating a plurality of conditional probabilities corresponding to links connecting nodes in a plurality of paths through the Markov inference model;
   determining, using the trained state prediction model, a set of next message classes and a set of predicted interaction outcomes, each message in the set of next message classes corresponding to the current message class, each predicted interaction outcome in the set of predicted interaction outcomes corresponding to a next message class in the set of next message classes, wherein the set of next message classes and the set of predicted interaction outcomes are determined by evaluating the plurality of conditional probabilities in the plurality of paths through the Markov inference model, wherein a predicted interaction outcome in the set of predicted interaction outcomes is determined responsive to a conditional probability of a next message class in the set of next message classes being above a threshold value; and
   ranking, according to the corresponding predicted interaction outcome, the set of next message classes.

2. The computer-implemented method of claim 1, wherein the set of next message classes is determined according to a conditional probability of a next message class in the set of next message classes having a parent in the current message class.

3. The computer-implemented method of claim 2, wherein forecasting an interaction outcome corresponding to the current message class comprises:
   computing, for the current message class, a first probability of success, the first probability of success comprising a sum of a probability of success for each next message class in the set of next message classes multiplied by the conditional probability of the next message class in the set of next message classes having a parent in the current message class, the probability of success comprising a probability that a next message class will result in a successful message class.

4. The computer-implemented method of claim 1, further comprising:
   recommending a natural language response type, the natural language response type corresponding to a next message class in the set of next message classes, the natural language response type comprising a suggested response type to the current message intended to improve an interaction outcome corresponding to the next message class.

5. The computer-implemented method of claim 1, further comprising:
   constructing, using a natural language message construction model, a set of natural language responses, each natural language response in the set of natural language responses corresponding to a next message class in the set of next message classes, each natural language response in the set of natural language responses comprising a suggested response to the current message intended to improve an interaction outcome corresponding to the next message class.

6. The computer-implemented method of claim 1, further comprising:
receiving a message identified as a parent message of the current message in the interaction;
classifying, using the natural language analysis, the parent message into a parent message class; and
updating, by updating the probability of the current message class having a parent in the parent message class, the trained state prediction model.

7. A computer usable program product comprising one or more computer-readable storage devices, and program instructions stored on at least one of the one or more storage devices, the stored program instructions comprising:
program instructions to train a state prediction model using a plurality of message sequences, each message in a message sequence classified into a message class, the training comprising configuring a Markov inference model to determine a plurality of conditional probabilities, each conditional probability comprising a probability of a message in a second message class following a message in a first message class, wherein a message class is represented by a node in the Markov inference model, the conditional probability is represented by a numerical value assigned to a link between corresponding nodes in the Markov inference model, wherein the training results in a trained state prediction model;
program instructions to classify, using a natural language analysis, a current message into a current message class, the current message being a portion of an interaction in narrative text form;
program instructions to forecast, for the interaction using the trained state prediction model, an interaction outcome corresponding to the current message class, the forecasting comprising computing a probability that the current message class will result in a successful message class, wherein the probability that the current message class will result in a successful message class is computed by evaluating a plurality of conditional probabilities corresponding to links connecting nodes in a plurality of paths through the Markov inference model;
program instructions to determine, using the trained state prediction model, a set of next message classes and a set of predicted interaction outcomes, each message in the set of next message classes corresponding to the current message class, each predicted interaction outcome in the set of predicted interaction outcomes corresponding to a next message class in the set of next message classes, wherein the set of next message classes and the set of predicted interaction outcomes are determined by evaluating the plurality of conditional probabilities in the plurality of paths through the Markov inference model, wherein a predicted interaction outcome in the set of predicted interaction outcomes is determined responsive to a conditional probability of a next message class in the set of next message classes being above a threshold value; and
program instructions to rank, according to the corresponding predicted interaction outcome, the set of next message classes.

8. The computer usable program product of claim 7, wherein the set of next message classes is determined according to a conditional probability of a next message class in the set of next message classes having a parent in the current message class.

9. The computer usable program product of claim 8, wherein program instructions to forecast an interaction outcome corresponding to the current message class comprises:
program instructions to compute, for the current message class, a first probability of success, the first probability of success comprising a sum of a probability of success for each next message class in the set of next message classes multiplied by the conditional probability of the next message class in the set of next message classes having a parent in the current message class, the probability of success comprising a probability that a next message class will result in a successful message class.

10. The computer usable program product of claim 7, further comprising:
program instructions to recommend a natural language response type, the natural language response type corresponding to a next message class in the set of next message classes, the natural language response type comprising a suggested response type to the current message intended to improve an interaction outcome corresponding to the next message class.

11. The computer usable program product of claim 7, further comprising:
program instructions to construct, using a natural language message construction model, a set of natural language responses, each natural language response in the set of natural language responses corresponding to a next message class in the set of next message classes, each natural language response in the set of natural language responses comprising a suggested response to the current message intended to improve an interaction outcome corresponding to the next message class.

12. The computer usable program product of claim 7, further comprising:
program instructions to receive a message identified as a parent message of the current message in the interaction;
program instructions to classify, using the natural language analysis, the parent message into a parent message class; and
program instructions to update, by updating the probability of the current message class having a parent in the parent message class, the state prediction model.

13. The computer usable program product of claim 7, wherein the stored program instructions are stored in the at least one of the one or more storage devices of a local data processing system, and wherein the stored program instructions are transferred over a network from a remote data processing system.

14. The computer usable program product of claim 7, wherein the stored program instructions are stored in the at least one of the one or more storage devices of a server data processing system, and wherein the stored program instructions are downloaded over a network to a remote data processing system for use in a computer readable storage device associated with the remote data processing system.

15. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to train a state prediction model using a plurality of message sequences, each message in a message sequence classified into a message class, the training comprising configuring a Markov inference model to determine a plurality of conditional probabilities, each conditional probability comprising a probability of a message in a second message class following a message in a first message class, wherein a message class is represented by a node in the Markov inference model, the conditional probability is represented by a numerical value assigned to a link between corresponding nodes in the Markov inference model, wherein the training results in a trained state prediction model;

program instructions to classify, using a natural language analysis, a current message into a current message class, the current message being a portion of an interaction in narrative text form;

program instructions to forecast, for the interaction using the trained state prediction model, an interaction outcome corresponding to the current message class, the forecasting comprising computing a probability that the current message class will result in a successful message class, wherein the probability that the current message class will result in a successful message class is computed by evaluating a plurality of conditional probabilities corresponding to links connecting nodes in a plurality of paths through the Markov inference model;

program instructions to determine, using the trained state prediction model, a set of next message classes and a set of predicted interaction outcomes, each message in the set of next message classes corresponding to the current message class, each predicted interaction outcome in the set of predicted interaction outcomes corresponding to a next message class in the set of next message classes, wherein the set of next message classes and the set of predicted interaction outcomes are determined by evaluating the plurality of conditional probabilities in the plurality of paths through the Markov inference model, wherein a predicted interaction outcome in the set of predicted interaction outcomes is determined responsive to a conditional probability of a next message class in the set of next message classes being above a threshold value; and program instructions to rank, according to the corresponding predicted interaction outcome, the set of next message classes.

16. The computer system of claim 15, wherein the set of next message classes is determined according to a conditional probability of a next message class in the set of next message classes having a parent in the current message class.

17. The computer system of claim 16, wherein program instructions to forecast an interaction outcome corresponding to the current message class comprises:

program instructions to compute, for the current message class, a first probability of success, the first probability of success comprising a sum of a probability of success for each next message class in the set of next message classes multiplied by the conditional probability of the next message class in the set of next message classes having a parent in the current message class, the probability of success comprising a probability that a next message class will result in a successful message class.

* * * * *